(No Model.)
R. JEFFERSON.
FENDER FOR PLOWS.
No. 601,376. Patented Mar. 29, 1898.
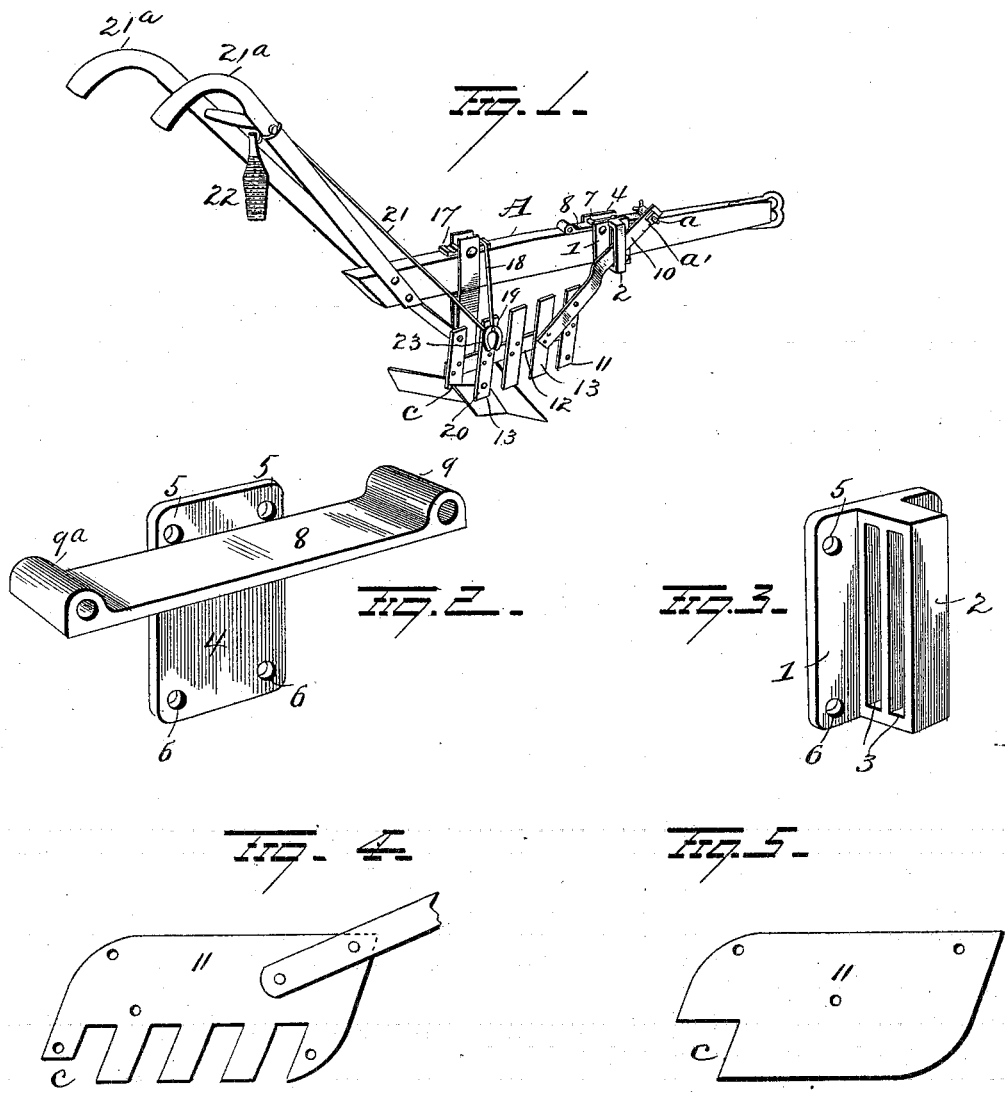
Witnesses
E. J. Nottingham
G. F. Downing
Inventor
R. Jefferson
By H. A. Seymour
Attorney

UNITED STATES PATENT OFFICE.

ROLLIN JEFFERSON, OF COLUMBUS, GEORGIA.

FENDER FOR PLOWS.

SPECIFICATION forming part of Letters Patent No. 601,376, dated March 29, 1898.

Application filed June 19, 1897. Serial No. 641,450. (No model.)

*To all whom it may concern:*

Be it known that I, ROLLIN JEFFERSON, a resident of Columbus, in the county of Muscogee and State of Georgia, have invented certain new and useful Improvements in Fenders for Plows; and I do hereby declare the following to be a full, clear, and exact description of the invention, such as will enable others skilled in the art to which it appertains to make and use the same.

My invention relates to an improvement in plow-fenders, and more particularly to the connections between the fender and plow-beam, the object of the invention being to provide simple and efficient means whereby to quickly and securely attach the fender supporting and guiding devices to the plow-beam without the necessity of boring holes through the beam.

A further object is to provide a fender supporting and guiding device that may be secured so as to allow the fender to be disposed on either side of the plow.

A further object is to provide a fender supporting and guiding device which shall be simple in construction, cheap to manufacture, and effectual in all respects in the performance of its functions.

With these objects in view the invention consists in certain novel features of construction and combinations and arrangements of parts, as will be more fully described, and pointed out hereinafter in the claims.

In the accompanying drawings, Figure 1 is a view showing my improvements applied to a plow. Figs. 2 and 3 are views of details, and Figs. 4 and 5 are views of modifications.

A represents a plow-beam, against one side of which a plate or casting 1 is disposed and adapted to project above and below the same, said plate having an elongated enlargement 2 cast thereon, and said enlargement having a series of vertical slots 3. Another plate 4 is disposed at the opposite side of the beam A from the plate 1 and adapted to project above and below the beam. The projecting ends of the plates 1 and 4 are made with bolt-holes 5 and 6 for the accommodation of suitable bolts 7, which pass through the respective plates 1 and 4 and transversely above and below the plow-beam, so as to secure said plates to the beam without the necessity of passing bolts through said beam. The plate 4 is made with an integral plate 8, disposed at right angles thereto and adapted to lie upon the plow-beam. The plate or arm 8 extends some distance forwardly and rearwardly from the plate 4 and terminates at its respective ends in perforated bosses 9 and $9^a$ for the reception of a transverse bar $a$. The bar $a$ passes loosely through the perforated boss and is screw-threaded at one end for the reception of suitable nuts $a'$, by means of which the arm 10 of the fender 11 is connected with said bar $a$. The bar $a$ is bifurcated or made wrench-shaped at its other end for the reception of a suitable tool by means of which to hold the bar from rotation when the nuts are being put on or removed. The fender-arm 10 is made to pass through and be guided in one of the slots of the enlargement 2. Thus it will be seen that by means of the bosses 9 and $9^a$ at either end of plate 8 the fender may be used on either side of the plow-beam by simply reversing the plates 1 and 4 and removing the bar $a$ from the boss 9 at one end and inserting same in boss $9^a$ at the other end of said bar, when the fender-arm and fender can be shifted to the other side and attached to the bar $a$.

The fender 11 may be made to consist of a bar 12, having a series of inclined fingers 13, spaced apart and secured thereto, the spaces between the fingers 13 being intended to permit the escape of fine dirt.

If desired, the fender may be made in the form of a continuous blade by inserting between the fingers 13 similar fingers or bars, or said fender may be made of a single piece, as shown in Figs. 4 and 5. In any case I prefer to notch or recess the rear end of the fender, as at $c$, whereby to permit the rear end of the plow-wing to project slightly beyond or outside of the blade, and thus effectively prevent the clogging of the plow. This notch or recess may be formed in the fender shown in Figs. 1 and 4 by removing a portion of the rear finger.

The upper forward end of the fender is provided with suitable bolt-holes to permit the ready attachment of the fender-arm 10, and the lower rear portion of the fender is also suitably perforated for the reception of bolts for the attachment of the fender-arm when the fender is reversed.

A notched plate 17 is provided on the plow-beam for the attachment of a wire 18, which extends to a hole 19 in the upper rear portion of the fender, at which point said wire is fastened, a hole 20 being provided in the lower forward end of the fender for the attachment of said wire when the fender is reversed. The purpose of the wire is to assist in keeping the rear end of the fender in proper position. A cord or wire 21 is also attached to the fender at 19 (or 20) and extends rearwardly to the plow-handles 21ª and is provided with a handle 22 at its end. Thus it will be seen that when it is desired to raise the fender it is simply necessary for the operator to pull the handle 22.

If desired, a weight 23 may be attached to the fender-blade, as shown in Fig. 1.

My improvements are very simple in construction, can be quickly and securely attached to a plow-beam without passing the bolts or other fastening devices through or into the plow-beam, and are effectual in all respects in the performance of their functions.

Slight changes might be made in the general form and arrangement of the several parts herein shown and described without departing from the spirit and scope of my invention, and hence I would have it understood that I do not limit myself to the precise details herein shown and described; but, Having fully described my invention, what I claim as new, and desire to secure by Letters Patent, is—

1. The combination with a plow-beam, of a plate at each side thereof, bolts passing through said plates above and below the plow-beam, a slotted enlargement on one of said plates, an arm projecting forwardly from the other plate, a fender and an arm secured at one end to said fender, passing through said slotted enlargement and pivotally attached to said first-mentioned arm, substantially as set forth.

2. The combination with a plow-beam, of plates at opposite sides thereof and having holes for the reception of bolts, a slotted enlargement on one of said plates, an arm projecting forwardly from the other plate and disposed parallel with the upper face of the beam, said arm projecting forwardly beyond the plate and terminating in a perforated boss, a fender, and a fender-arm projecting through said slotted enlargement and pivotally connected with said boss, substantially as set forth.

3. The combination with a plow-beam, of a plate at each side thereof, bolts passing through said plates, a slotted enlargement on one of said plates, a forwardly-extending arm on the other plate, a fender consisting of a bar and fingers secured thereto and spaced apart, and an arm secured to said fender, passing through the slotted enlargement and pivotally connected with the free end of said first-mentioned arm, substantially as set forth.

4. The combination with an arm having bosses at each end, plates located between these bosses and embracing the arm, and means for securing the arm and plates together and to the plow-beam, one of said plates having a slotted enlargement, of a fender having means for pivoting it to the arm, said fender guided in its passage through the slotted enlargement.

5. The combination with integral plates 4 and 8, the latter adapted to rest on the top of a plow-beam and provided with a boss at one end of plate 1 having elongated enlargements, means for securing plates 4 and 1 together, and a fender pivotally connected at the boss on plate 8 and loosely connected with the elongated enlargements.

In testimony whereof I have signed this specification in the presence of two subscribing witnesses.

ROLLIN JEFFERSON.

Witnesses:
F. G. LUMPKIN,
D. F. WILLCOX.